UNITED STATES PATENT OFFICE.

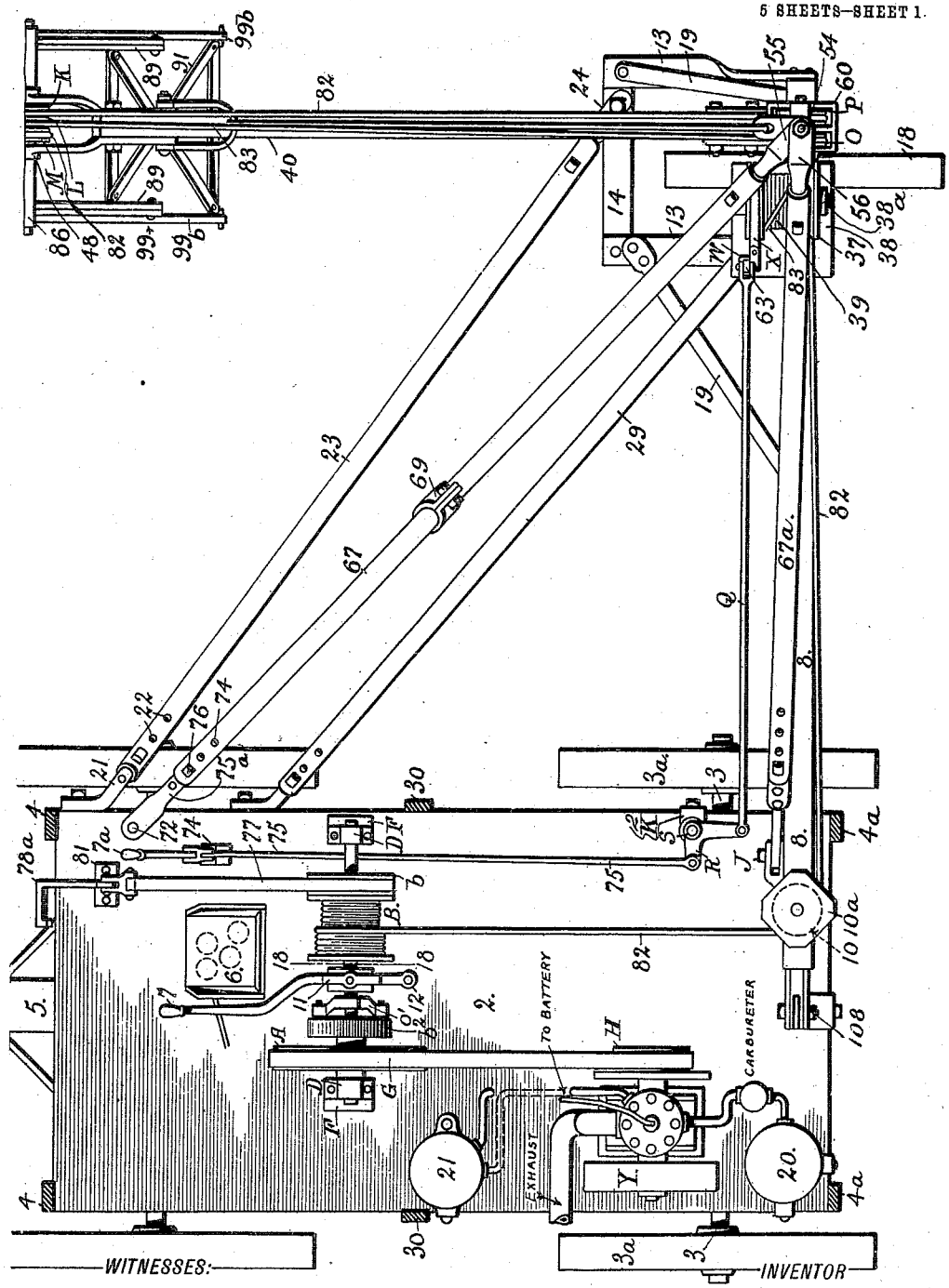

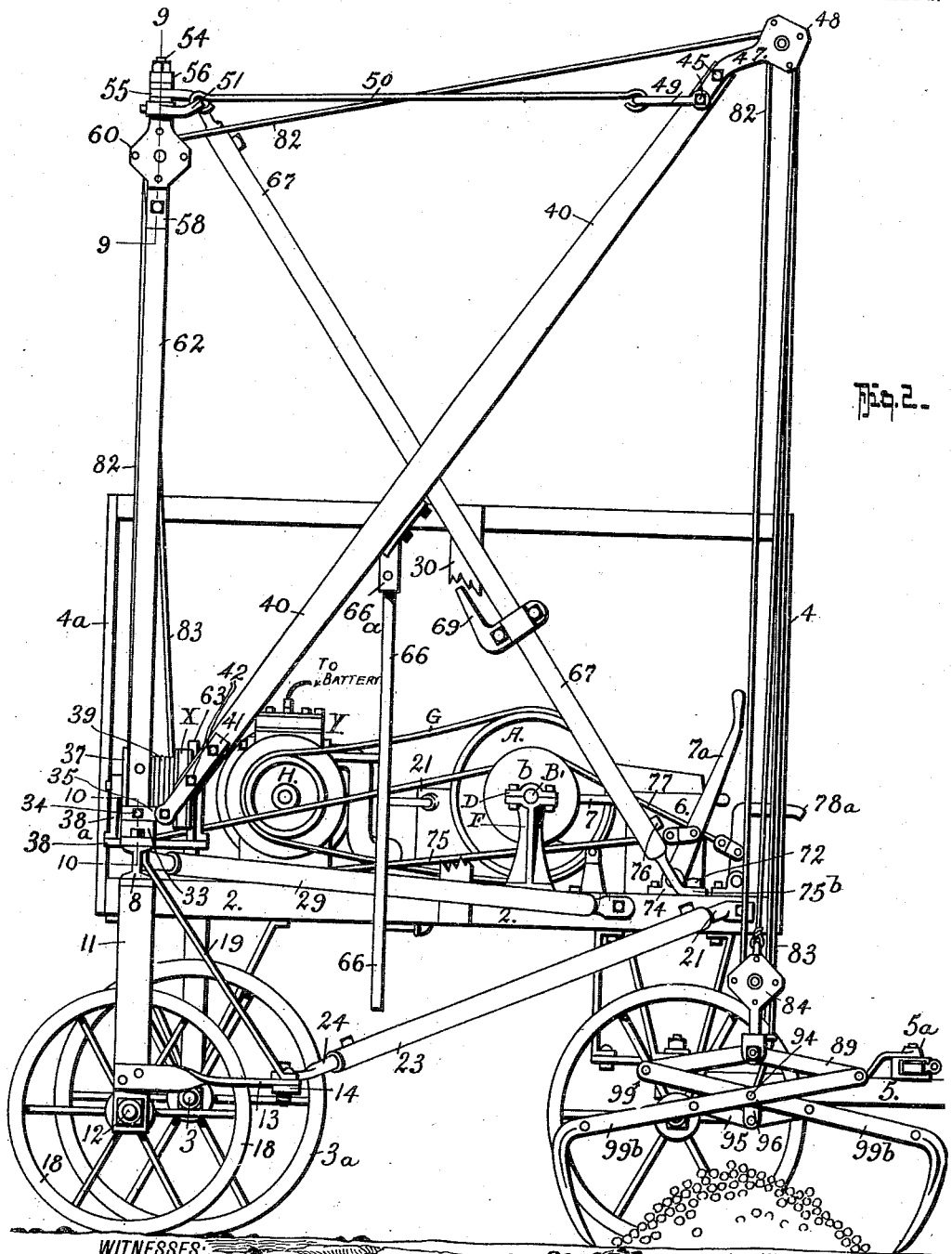

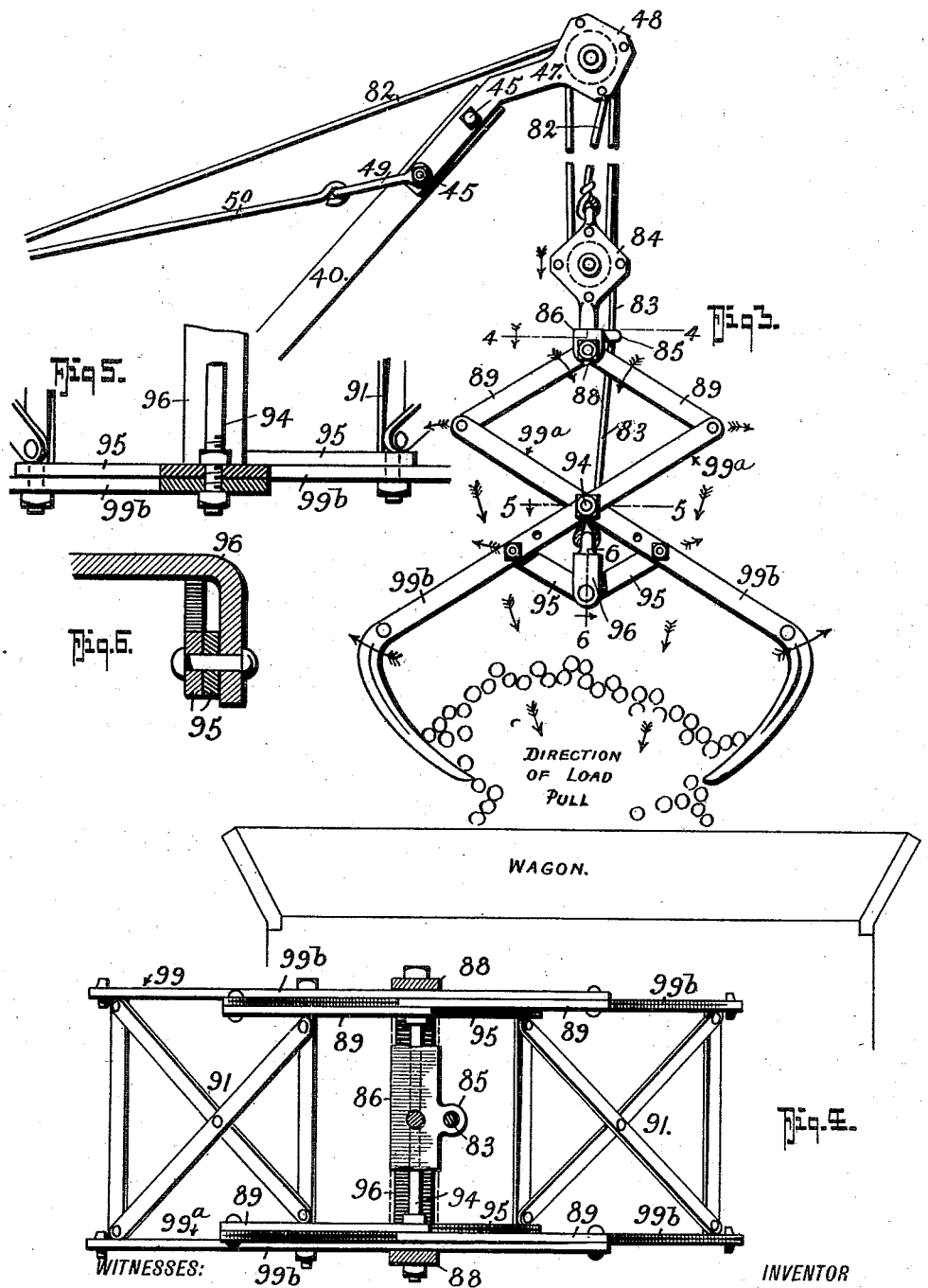

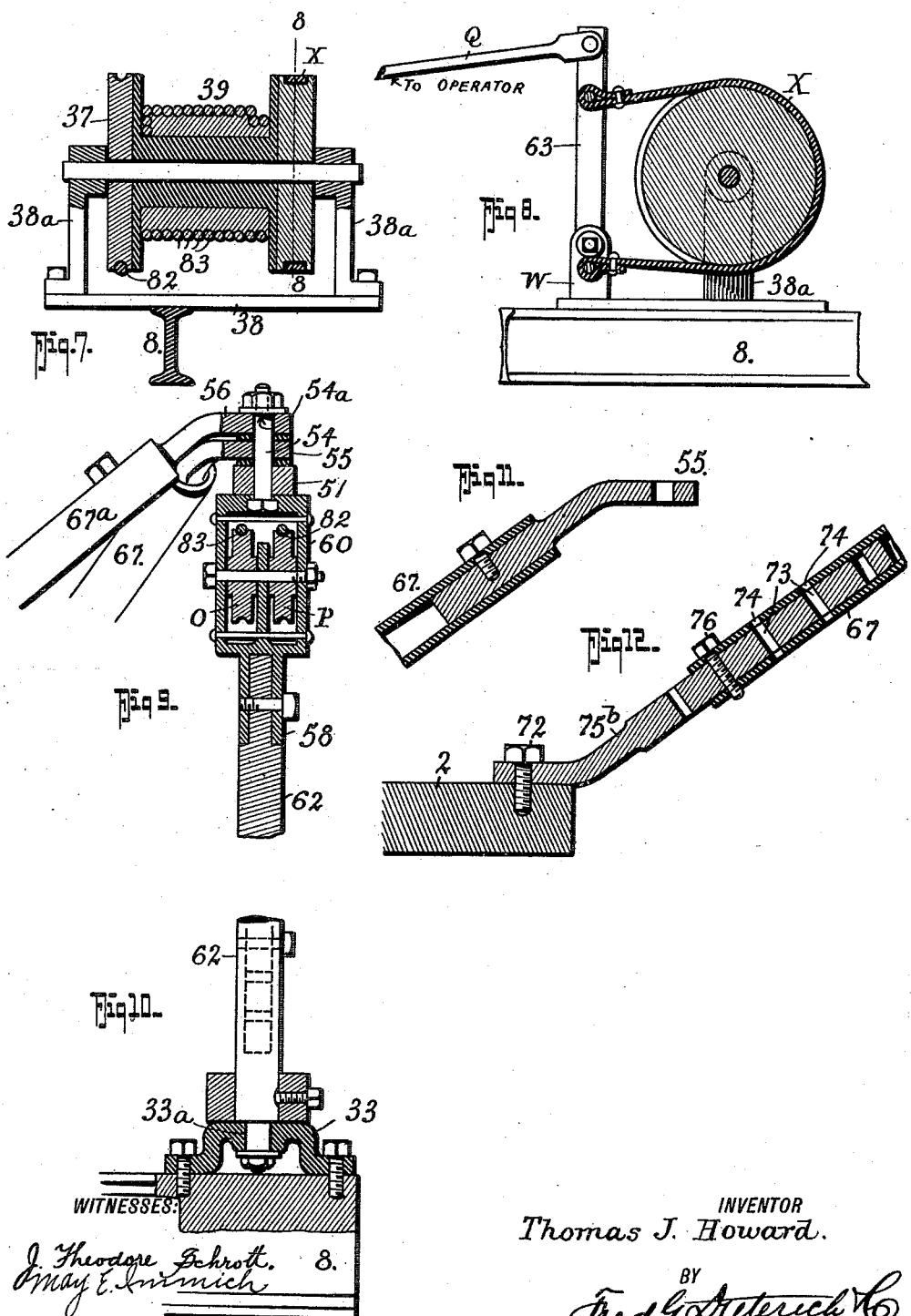

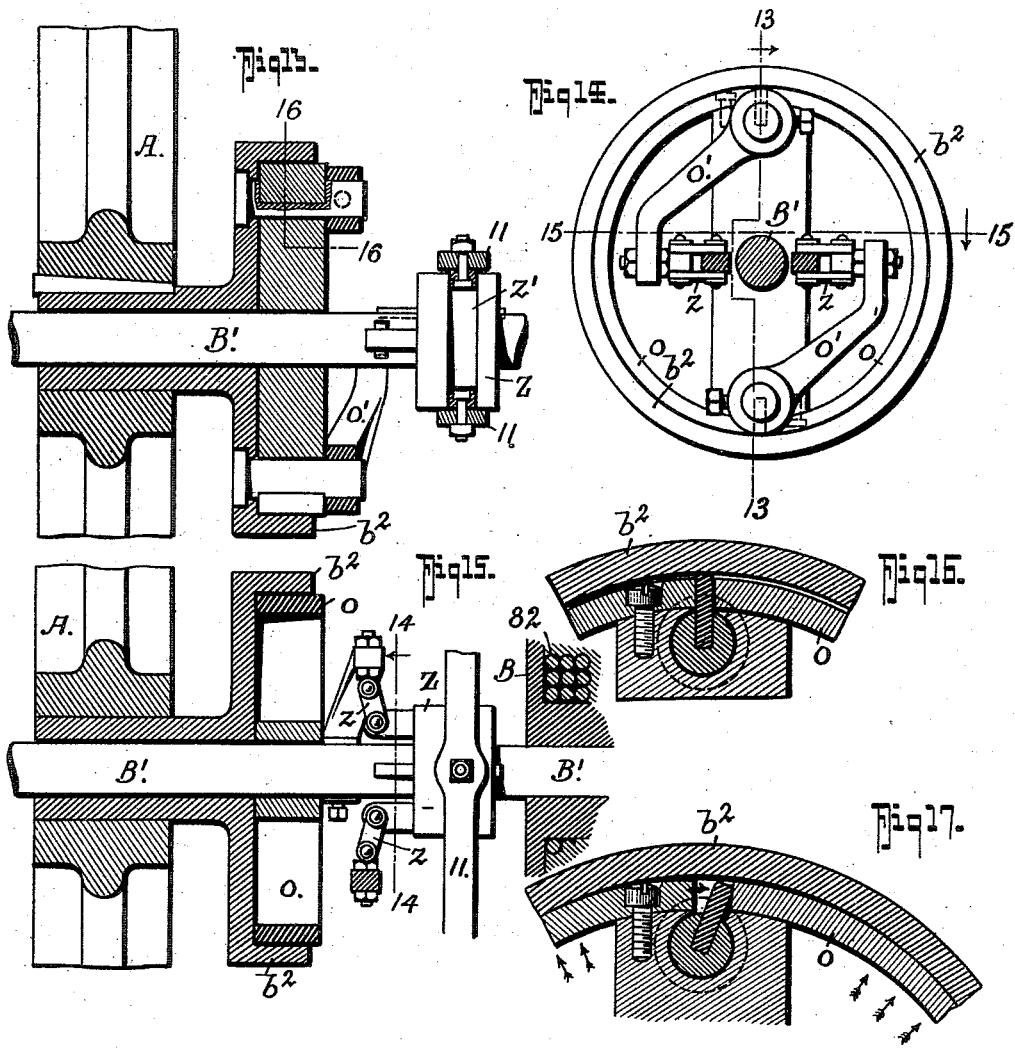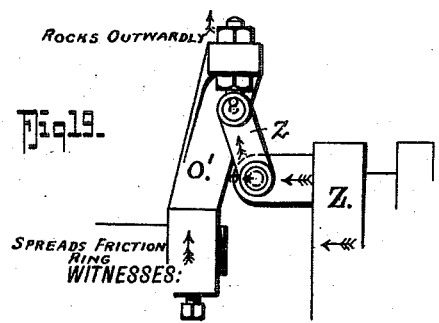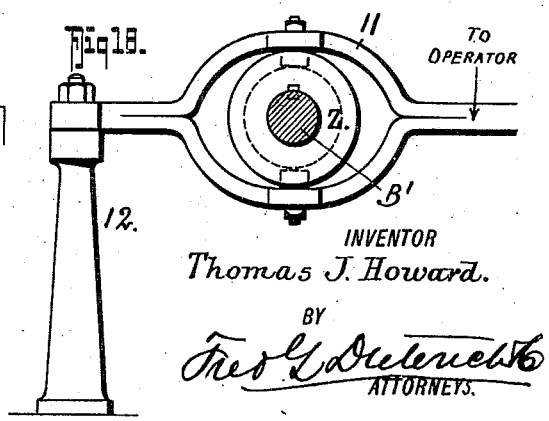

THOMAS J. HOWARD, OF NEW ORLEANS, LOUISIANA.

SUGAR-CANE LOADER.

973,433.  Specification of Letters Patent.  Patented Oct. 18, 1910.

Application filed April 15, 1909. Serial No. 490,058.

*To all whom it may concern:*

Be it known that I, THOMAS J. HOWARD, residing in the city and parish of New Orleans and State of Louisiana, have invented a new and Improved Sugar-Cane Loader, of which the following is a specification.

My invention, which relates generally to improvements in means for picking up and loading sugar cane, more particularly has for its object to provide an improved construction of a portable mechanism, adapted for being readily conveyed to the cane field for picking up the cane that has been cut and piled along the rows of the cane and that will conveniently and expeditiously load the cut cane into a wagon or other vehicle, by which it can be quickly transferred direct to the sugar mill or onto cars where railway transportation is utilized or to any other desired place.

My invention comprehends a portable platform and an improved coöperative arrangement and combination of parts, including an adjustable and swinging derrick and grapple devices mounted on the derrick, motor mechanism on the platform for actuating the grapple and controlling lever mechanism operable from the driver's seat, of a simple, inexpensive and stable construction, capable of being easily manipulated and that will greatly facilitate the handling of cut sugar cane.

In its subordinate features, my invention consists in certain details of construction and peculiar combination of parts, all of which will be hereinafter fully described, specifically pointed out in the claims and illustrated in the accompanying drawings, in which:—

Figure 1, is a plan view of my construction of cane loader. Fig. 2, is a side elevation thereof, the grapple devices being at the lowermost and open position, about to remove a pile of cane. Fig. 3, is a detail elevation of the grapple devices, showing them "tripped" and as discharging the load into the wagon. Fig. 4, is a horizontal section on the line 4—4 of Fig. 3 in the direction of the arrow. Fig. 5, is a similar view on the line 5—5 of Fig. 3 in the direction of the arrow. Fig. 6, is a detail vertical section on line 6—6 on Fig. 3 in the direction of the arrow. Fig. 7, is a longitudinal section of the grapple operating drums. Fig. 8, is a cross section on the line 8—8 on Fig. 7. Fig. 9, is a detail cross section of the upper main standard end, taken practically on line 9—9 on Fig. 2. Fig. 10, is a similar view of the lower end of said standard on the line 10—10 on Fig. 2. Fig. 11, is an enlarged section of the upper end of one of the telescopic braces. Fig. 12, is an enlarged section of the lower end of one of the telescopic braces. Fig. 13, is a vertical section of the hoisting drum friction device taken on the line 13—13 of Fig. 14, in the direction of the arrow. Fig. 14, is a cross section on line 14—14 on Fig. 15, in the direction of the arrow. Fig. 15, is a horizontal section on the line 15—15 on Fig. 14 in the direction of the arrow. Fig. 16, is an enlarged section on line 16—16 on Fig. 13 the internal friction band being inoperative. Fig. 17, is a similar view, the parts being locked to rotate together. Fig. 18, is a cross section on the line 18—18 on Fig. 1. Fig. 19, is a diagrammatic view illustrating the operation of the link mechanism for the friction drum.

In the practical construction, my invention includes a four wheel truck consisting of the front or draft gear to which the draft pole or tongue 5 is attached in the usual manner and on which the double tree $5^a$ is mounted, the rear gear portion consisting of the axle 3 and the traveler wheels $3^a$—$3^a$. Upon the axles of truck members is mounted a platform 2 that has pendent side beams 30 and pendent front and rear end beams 4 and $4^a$. At a suitable point and near the inner side and front end is mounted the driver's seat 6, which forms the top closure for a box or chamber in which the batteries that form a part of motor mechanism can be conveniently held. Adjacent the driver's seat and extended in the longitudinal plane of the platform is hand lever 7 adapted for being easily manipulated by the driver and which coöperates with certain clutch mechanism for throwing the hoisting windlass in and out of gear at desired times. $7^a$ designates another lever adjacent the seat fulcrumed at the lower end in the bracket ears 74 secured to the platform, the functions of the said levers $7^a$ and another lever $78^a$ foot controlled from the driver's seat being hereinafter clearly set forth.

8 designates an I-beam that is pivotally attached to a horizontal pivot 108 on the top of the platform 2 and extends outwardly from the rear end thereof, as best shown in Fig. 1, and this beam at its outer end has a frame composed of the pendent bars 11—11 in the lower ends of which is journaled the axle 12 that carries the guide or supporting wheel 18, as best shown in Fig. 2, from which it will be also noticed that to the lower end of the members 11—11 just above the axle 12 are secured short horizontal bars 13—13 that straddle the front part of the wheel 18 and have their front ends connected by a cross bar 14 secured thereto by bolts, the said frame bars 13—13 and 14 being securely braced by a rod 19 secured thereto and to the beam 8. By reason of mounting the beam 8 on the wheeled frame 11 and hinging the inner end of the said beam 8 to the platform 2 so its outer end moves in the vertical plane, it is manifest that the said beam and the wheeled frame at the outer end thereof will freely rise and fall to compensate for the condition of the surface over which the wheel 18 travels, it being obvious that in passing over a hilly place the wheel and the beam 8 rise and in passing over a ditch the wheel 18 is held suspended with the beam 8 since the inner end of the said beam has bearing on the platform 2, thus allowing the wheel or beam 8 to rise up or down as it passes over a hill without raising or lowering the wagon. The frame on which wheel 18 is journaled is further braced by a diagonal beam formed of telescopic sections 23 and 21, the latter being solid and adjustably secured to the section 23 by a bolt that passes through any one of a series of apertures 22 in the members 21 and 23. The inner end of the diagonal brace has a short solid section 24 fixedly connected to the member 23 and bolted to the front bar 14 of the frame 13. 29 is another, but horizontally disposed brace, the outer end of which is fastened to the outer end of the I-beam 8 and the inner end is bolted to the wagon body 2 as clearly shown in Fig. 1, the said inner end being a solid member adjustably secured to the inner end of the hollow brace 29.

33 designates a yoke bracket secured to the top of the outer end of the I-beam that has a socket $33^a$ to receive the lower end of a standard or boom 62 in practice also made of telescopic sections whereby the said standard may be readily lengthened or shortened, see Fig. 10. The standard 62 is rotatably mounted in said bracket 33 and also has pivotal bearing at the top as shown in Figs. 9 and 10, so that the standard 62 and its boom may be swung laterally when found necessary.

60 designates a double pulley block, through which the grapple lifting ropes pass, and said block is formed with a ferrule 58 to be fitted on the upper end of boom 62 and secured thereto. Standard 62 is braced to its vertically adjusted positions by telescopic braces or stay members 67 and $67^a$ best shown in Figs. 1 and 2, each of which has an eye 55, 56 at the upper end to fit over the pivot bolt 54 which is formed with a shoulder $54^a$ so that the nut may be screwed down tight, prevent binding and form a good bearing for the standard 62. The lower end of the brace $67^a$ is pivotally secured to the I-beam 8 by the bolt J and the lower end of the brace 67 extends forwardly and the male section $75^b$ thereof is bolted to the platform 3 by a bolt 72, said male section being drilled with adjusting holes 73 which register with apertures 74 in the end of brace 67 so that it being desired to adjust the brace in either direction, it is only necessary to withdraw the pin 76 and place it in any of the registering holes as shown, for instance, in Fig. 12.

40 designates an elevating arm or boom, the lower end of which is pivotally secured to a strap bearing 35 secured to the lower end of the standard 62 by the bolt 34, and 41 designates side plates that constitute the lower or pivotal end of the boom 40, they being bolted to the boom portion proper by the bolts 42, as clearly shown in Fig. 2. Boom 40 is braced to the standard 62 by a rod 50 that has one end hooked into a U shaped hanger 49 pivotally connected to the upper end of the boom 40 by one of the bolts 45 that secure the strap irons 47, presently again referred to, to the said boom. Inner end of rod 50 is hooked into a U-shaped hanger 51 that is pivotally connected to the part 58 by the bolt 54, the said rod 50 serving to hold the boom 40 suspended at the desired position. The strap irons 47 before referred to, carry a pulley block 48 having three sheaves K, L, M and for pulling boom 40 down a hand lever 66 hangs pendently from the said boom 40 to which it is adjustably secured by the clip irons $66^a$ as shown.

39 designates a trip drum that is mounted on the bracket members $38^a$ of a base plate 38 mounted on the outer end of the I-beam, the said drum being provided for receiving the trip cable that coöperates with pick up and delivery mechanism, the peculiar construction of which forms an essential feature of my invention, and which I shall now describe, reference being particularly directed to Figs. 1 and 7 of the drawings, from which it will be seen that a parallel set, (two being shown) of opposing hook or grapple members 99, $99^a$ each having crossing arms $99^b$—$99^b$ are pivotally connected by pivot rod 94, and braced at the outer or bent portions by the cross members 91—91. To the outer ends of the crossed arms 99ᵇ—99ᵇ are connected toggle links 89—89, whose upper ends are pivotally joined to the pendent members 88 on a cross bar 86, hung from a pulley block 84 to which is connected one end of the hoisting cable 82 that passes up over a pulley M on the block 48, thence down under the pulley in block 84, thence up and over pulley K in block 48, then over pulley block 60, then down and under guide wheel 37, mounted on the trip drum shaft and thence over a horizontal guide pulley 10 in the block 10ᵃ mounted on the inner end of the beam 8 to the hoisting drum B mounted on the platform 2, as clearly shown in Fig. 1. The grapple or lift devices also include toggle links 95—95 pendently disposed with respect to the members 99ᵇ—99ᵇ, whose upper ends are arranged for adjustable pivotal connection with the said arms 99ᵇ at points below their crossed or pivotal connection, the lower ends of the said toggle links 95—95 being pivotally joined to a cross bar 96. On cross bar 86 is an eye 85 through which a trip cable 83 runs and the said cable 83 has its lower end secured to the cross bar 96 in such manner that when it is drawn in the several toggle members and the grapple arms assume the open position shown in Fig. 2 and when the said cable 83 is relaxed or let out, in the manner presently explained, the said grapple members assume the closed or grappling position. The aforesaid trip cable 83 whose lower end is fastened to the cross bar 96 as stated, passes up over the pulley L in block 48 and the pulley O in block 60, and from the said pulley O it passes down and around the trip drum 39 and is secured thereto in any approved manner. The drum 39 is controlled from the driver's seat by a lever actuated mechanism that includes a lever 63, the lower end of which is fulcrumed on a bracket piece W bolted on the outer end of the beam 8 adjacent the drum 39 and to this lever is connected one end of a brake strap X that takes around the drum 39, the other end being secured to the support W.

Q designates a rod having its outer end pivotally joined to the upper end of the lever 63 and whose inner end connects to a bell crank lever R pivoted at S on a bracket piece K on the platform 2 and the said bell crank joins through the rod 75 with the lever 7ᵃ located adjacent the driver's seat, as clearly shown in Fig. 1. 78ᵃ has for its object to hold and release the hoisting drum B and the said lever is fulcrumed in an angle plate or stirrup 81 as best shown in Fig. 1, by reference to which it will also be noticed a brake strap 77 is connected to the said lever 78ᵃ and extends rearwardly, passes over a brake pulley member b on the drum B and has its free end secured to the platform 2.

The drum B is mounted in bearings F—F having boxings D—D and the axle of said drum carries a driver pulley A, around which takes the endless drive chain or belt G that connects with the driving pulley H on the motor engine Y suitably mounted on the platform 2, as shown. Suitable clutch mechanism is also provided for coöperating with the drum B and its axle from the driver's seat, for controlling the hoisting of grapples, and I prefer to use the clutch mechanism shown in detail in Figs. 13 to 17 of the drawings, which show the drum B fixedly mounted on the drum shaft B′. The clutch device is formed with an annular internal cone friction rim b² for coacting with a cone clutch rim O loosely mounted on the shaft B′ and connected to the angle arms o′ that are bolted to the link members z—z that straddle the shaft B′ and project from the collar Z, also slidably mounted on the shaft B′ and formed with an annular groove z′, to receive the forked end 11 of a throw lever 7 fulcrumed at the inner end on a bracket 12 on platform 2, the outer end of said lever being positioned adjacent the driver's seat as shown.

20 designates a gasolene tank and 21 a water tank mounted on platform 2.

Operation: The manner in which my loading machine is used is best explained, as follows. The sugar cane having been cut and laid or piled in rows in the field, the loader is conveyed to the field to the desired point when the boom or elevator arm 40 is swung over the pile to be lifted and loaded by means of the hand lever 66 which adjusts the grapple devices directly over a row of sugar cane, it being understood that when transporting the machine to the field, the grapple devices are hung on a hook 69 clamped on the brace beam 67. When at the proper point the grapple devices are lifted off the said hook 69 and lowered (with the grapple members open) to the ground over a pile of the cut cane, the grapples being now in position to be elevated, the driver on seat 6 now applies the clutch mechanism to start hoisting drum B which then begins to elevate the grapples which now close under the cane pile and grapple the cane, and lift a load. When the load is elevated to the point desired and high enough to clear the top of the wagon or other receptacle, foot brake 78ᵃ is put on and the friction brake mechanism for drum B is released, which operation holds the grapples with the load suspended at the elevated position, after which the said grapple is swung over the wagon and tripped, which operation is done by adjusting hand lever 7ᵃ to apply the brake to drum 39 to hold the trip cable taut as the grapple drops after foot lever 78ᵃ is released. It will be readily understood that since one end of the trip cable 83 is attached to the grapple and the other end to the trip drum 39 the hoisting cable 82 in frictional contact with the pulley wheel 37 on the shaft of drum 39, will cause the said drum 39 to turn and take up slack on trip cable 83 as the pull cable 82 is hauled in and further when the said trip drum is firmly clamped by its coacting brake device when the grapple is in the air, it will cause the weight of the grapple devices to come on the said trip cable 83.

Having thus described my invention, what I claim and desire to secure by Letters Patent, is:

1. A cane loader which comprises a portable platform, a beam pivotally connected at the inner end to the platform, and projected laterally therefrom, a wheeled support for the outer end of the beam, hoisting means including cane grappling devices mounted on the outer end of the beam and mechanisms that coöperate with the hoisting means for actuating the said means, said mechanisms being mounted on and controlled by the operator on the platform.

2. A cane loader, comprising a portable platform, a subframe that projects laterally therefrom, a mast mounted on the subframe, a boom mounted to swing vertically and laterally to coöperate with the mast, flexible connections that join the upper boom and mast ends, grappling devices suspended from the boom, including a trip for releasing the grapples, means mounted on the platform, the mast and boom for lifting the grapples and other means for actuating the trip to release the grapples.

3. In a cane loading machine of the character described, the combination with the portable main supporting body, a beam pivotally connected with said body, and horizontally extended from said body to move laterally, a mast and a boom on said beam, said boom being mounted for vertical and lateral movement, a grapple mounted on said boom, means operable from said main supporting body and mounted on said mast and boom for lifting and simultaneously closing said grapple on the cane as such grapple is lifted, and means operable from the main platform for tripping said grapple to release the load.

4. In a cane loader of the character described, the combination with a main platform, the masts, the beam that supports the masts, and the boom pivotally mounted on the masts to swing laterally and vertically; of a loading grapple comprising opposing toggle members, a lift rope connected thereto to close the said members over the load when the lift rope is pulled, means for holding the lift rope locked to its desired adjusted position, and means for tripping the toggle members to release the load.

5. In a cane loader of the character described, the combination with a wheeled platform, a horizontally projected beam whose inner end is pivotally mounted on the platform to permit the outer end to swing vertically, and a ground support for the said outer end; of pick up grapple devices, comprising toggle members that automatically open when lowered to straddle the cane pile, a lifting means operable from the platform that closes the grapples over the cane load when they are raised, a device for spreading the toggles operable from the platform, and means for locking the lifting means to hold the grapples to the elevated position during the operation of tripping or spreading them to discharge the load.

6. In a cane loader of the character described, the combination with the platform, the mast and the swinging boom, of pick up grappling devices comprising toggle members that automatically open to straddle the cane pile when lowered, a lift rope operable from the platform for elevating the grapple with its load, a tripper device on the grapple for opening the members to discharge the load, a tripper rope, wind-up drum for the said rope, actuated by the grapple lifting rope, and a brake for holding the tripper rope receiving drum when the lifting rope is released to drop the grapple.

7. In a cane loading machine of the character described, the combination with the wheeled platform, the movable standard or mast mounted thereon, adjustable braces which connect the upper end of the mast with the platform, a boom vertically and laterally movable that coöperates with the mast, a beam having a frame at its outer end, a grapple consisting of toggle members arranged to open and straddle the cane pile when lowered thereover, guide pulleys on the mast, the boom and the beam, and a pulley on the frame at the outer end of said beam, a lifting rope that takes over the pulleys, connects with the grapple and is operable from the main platform, a drum on one of the pulleys, a brake that coacts with the drum and is operable from the platform, means on the platform for taking in and holding the lift rope, a trip that forms a part of the grapple devices adapted to open the grapples when it is pulled on, a trip drum, a pulling rope for the grapples, said rope passing over the pulleys on the boom and the mast and wound on the trip drum for the purposes specified.

8. In a machine of the character described, the combination with the portable platform, and a beam that extends horizontally from the platform, said beam having its inner end pivotally connected to the platform to permit the outer end thereof to move vertically and a ground support for the said outer end, a mast and a boom mounted on the outer end of the beam, the boom having lateral and vertical adjustment; of grapple devices for lifting the load, an elevating rope attached thereto, guides for the same, a windlass on the platform for taking up the said rope, and a brake mechanism for holding the windlass with the elevating rope wound thereon.

THOMAS J. HOWARD.

Witnesses:
H. L. YOUNGS,
D. L. THOM.